United States Patent
Park (10) Patent No.: US 9,847,200 B1
(45) Date of Patent: Dec. 19, 2017

(54) MOLDED CASE CIRCUIT BREAKER

(71) Applicant: LSIS CO., LTD., Gyeonggi-do (KR)

(72) Inventor: Jae-Won Park, Gyeonggi-do (KR)

(73) Assignee: LSIS CO., LTD., Gyeonggi-do (KR)

( * ) Notice: Subject to any disclaimer, the term of this patent is extended or adjusted under 35 U.S.C. 154(b) by 0 days.

(21) Appl. No.: 15/483,374

(22) Filed: Apr. 10, 2017

(30) Foreign Application Priority Data

Dec. 2, 2016 (KR) .................. 10-2016-0163755

(51) Int. Cl.
*H01H 71/02* (2006.01)
*G01K 1/14* (2006.01)
*G01K 3/00* (2006.01)
*G01K 1/02* (2006.01)

(52) U.S. Cl.
CPC ............... *H01H 71/02* (2013.01); *G01K 1/02* (2013.01); *G01K 1/14* (2013.01); *G01K 3/005* (2013.01); *H01H 2300/03* (2013.01)

(58) Field of Classification Search
CPC .............. H01H 71/02; H01H 71/0264; H01H 71/0228; H01H 71/025; H01H 71/08; H01H 71/0207
USPC ................................. 200/51 R, 293; 335/202
See application file for complete search history.

(56) References Cited

U.S. PATENT DOCUMENTS

| 3,346,777 A | | 10/1967 | Leonard et al. | |
|---|---|---|---|---|
| 4,260,863 A | * | 4/1981 | Appleton | H01H 9/043 218/1 |
| 4,485,283 A | * | 11/1984 | Hurtle | H01H 73/18 218/143 |
| 4,611,189 A | * | 9/1986 | Mikulecky | H01H 33/75 218/103 |

(Continued)

FOREIGN PATENT DOCUMENTS

| EP | 2028678 A1 | 2/2009 |
|---|---|---|
| JP | 2010103116 A | 5/2010 |

(Continued)

OTHER PUBLICATIONS

Korean Office Action dated Oct. 16, 2017 in connection with the counterpart Korean patent application.

(Continued)

*Primary Examiner* — Gary Paumen
(74) *Attorney, Agent, or Firm* — Nath, Goldberg & Meyer; Jerald L. Meyer (57) ABSTRACT

The present disclosure relates to a molded case circuit breaker. In accordance with one aspect of the present disclosure, a molded case circuit breaker for use in connection with a main busbar provided on a distribution board panel includes a power-source-side terminal provided to a front portion of a case and having a terminal assembly hole formed at an upper portion thereof; a base bus supporter comprising a connector protruding from a front surface thereof so as to engage with the main busbar installed on one (Continued)

side of the distribution board panel, the base bus supporter being coupled to an upper surface and a lower surface of the power-source-side terminal; an auxiliary cover plate coupled to an upper portion of the power-source-side terminal and provided with a temperature measurement hole communicating with the terminal assembly hole.

10 Claims, 7 Drawing Sheets

(56) References Cited

U.S. PATENT DOCUMENTS

| | | | |
|---|---|---|---|
| 5,510,948 A * | 4/1996 | Tremaine | H05B 39/00 |
| | | | 361/18 |
| 5,805,813 A | 9/1998 | Schweitzer, III | |
| 7,170,020 B2 * | 1/2007 | Kawata | H01H 9/0264 |
| | | | 200/293 |
| 9,524,842 B2 * | 12/2016 | Sisley | H01H 71/0207 |
| 2010/0079973 A1 | 4/2010 | Brandt et al. | |
| 2013/0107412 A1 | 5/2013 | Schalk et al. | |
| 2016/0181046 A1 * | 6/2016 | Sisley | H01H 71/0207 |
| | | | 200/50.32 |
| 2016/0268085 A1 | 9/2016 | Oh | |

FOREIGN PATENT DOCUMENTS

| | | |
|---|---|---|
| JP | 2011146240 A | 7/2011 |
| JP | 4743753 B2 | 8/2011 |
| KR | 10-2009-0130992 A | 12/2009 |
| KR | 1020140032261 A | 3/2014 |
| KR | 10-1522270 B1 | 5/2015 |

OTHER PUBLICATIONS

Extended European Search Report dated Nov. 2, 2017 corresponding to application No. 17185451.0-1808.

* cited by examiner

MOLDED CASE CIRCUIT BREAKER

CROSS-REFERENCE TO RELATED APPLICATIONS

This application claims the priority of Korean Patent Application No. 10-2016-0163755 filed on Dec. 2, 2016, in the Korean Intellectual Property Office, the disclosure of which is hereby incorporated by reference in its entirety.

BACKGROUND

1. Technical Field

The present disclosure relates to a molded case circuit breaker, and more particularly, to a molded case circuit breaker capable of measuring the temperature of the connector of a main busbar with the molded case circuit breaker connected to the main busbar.

2. Description of the Related Art

In general, a molded case circuit breaker (MCCB) is an electric device that protects circuits and loads by automatically shutting off the circuit in the event of electrical overload or short circuit.

Among these MCCBs, a plug-in MCCBs is connected to the main busbar of the panel board (or distribution board).

Figure 1:
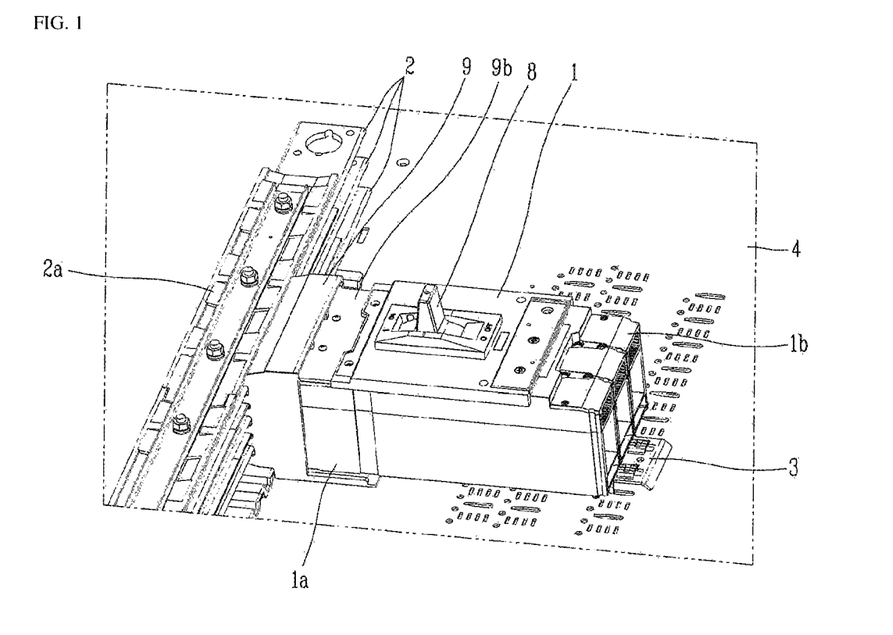
FIG. 1 is a perspective view of a MCCB installed in a distribution board according to the prior art.
Figure 2:
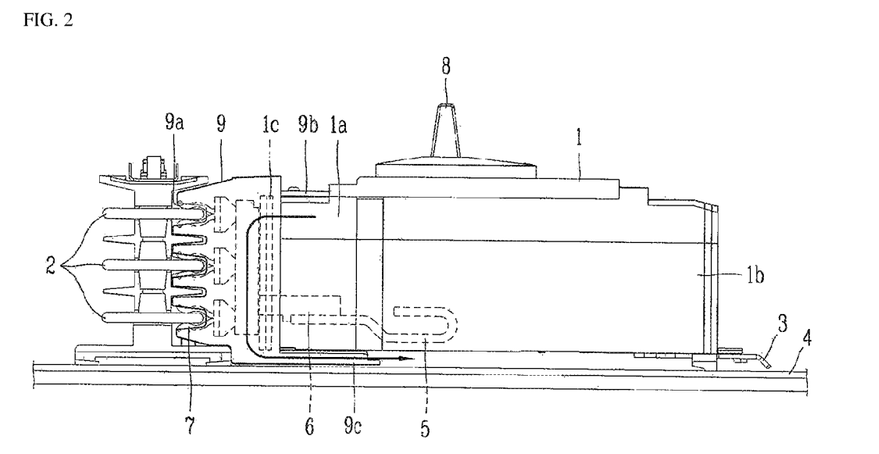
FIG. 2 is a side perspective view of FIG. 1, where only main parts related to the present disclosure are shown.
Figure 3:
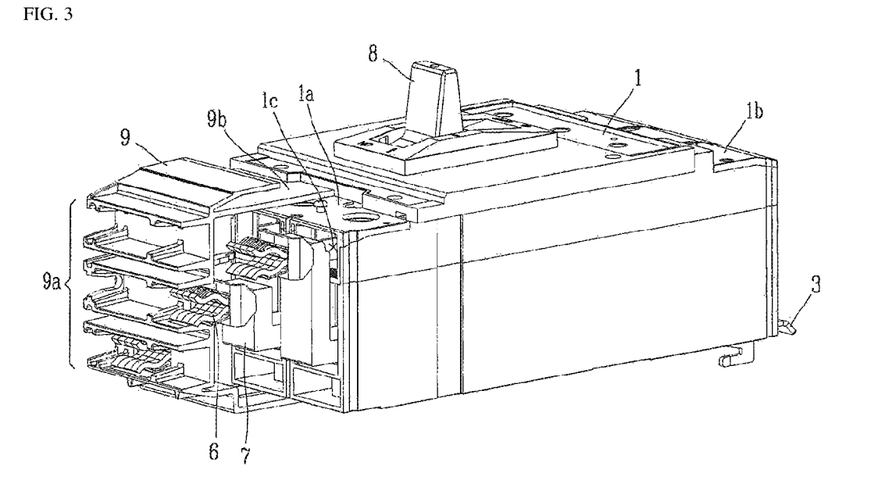
FIG. 3 is a front perspective view of an MCCB applied to FIG. 1, where the base bus supporter is partially cut away.
Figure 4:
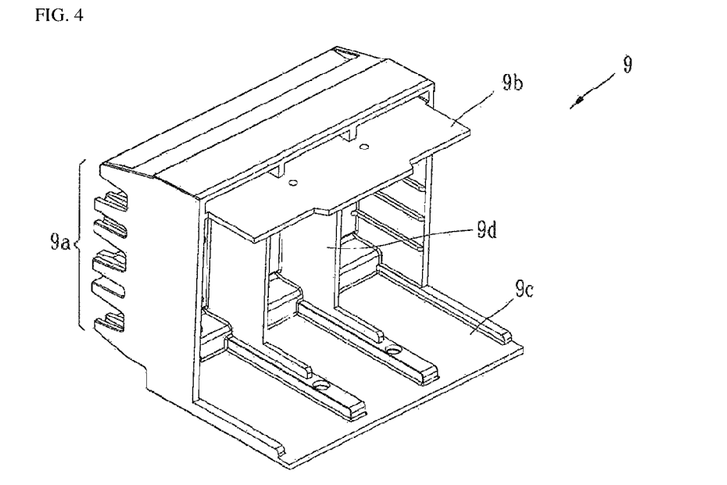
FIG. 4 is a perspective view of a base bus supporter applied to FIG. 1.

FIGS. 1 to 4 show a plug-in MCCB according to the prior art. FIG. 1 is a perspective view of a MCCB installed in a distribution board, FIG. 2 is a side perspective view of the MCCB, and FIG. 3 is a front perspective view of the MCCB applied to FIG. 1, where a bus supporter is partially cut away. FIG. 4 is a perspective view of a base bus supporter applied to FIG. 1.

Referring to FIGS. 1 to 4, the MCCB 1 includes a power-source-side terminal 1a and a load-side terminal 1b. The power-source-side terminal 1a is connected to a main busbar 2 and the load-side terminal 1b is connected to a distribution board panel 4 by a mounting bracket 3. In the case of a three-phase circuit, three busbars 2 are provided side by side. The busbars 2 are longitudinally arranged on one side of the distribution board panel 4 by a busbar mounting bracket 2a formed of an insulation material.

A fixed contact arm 5 is provided inside the MCCB 1 and a connection busbar 6 and a finger assembly 7 for connecting a fixed contact arm 5 and the main busbar 2 are provided on the power-source-side terminal 1a. Thus, the electric current may flow from the main busbar 2 to the fixed contact arm 5 via the finger assembly 7 and the connection busbar 6. When electricity is applied, that is, the handle 8 is turned to the On position, a movable contact arm (not shown) is connected to a fixed contract arm 5, and an electric current flows in the circuit.

The finger assembly 7 is configured to have a constant voltage and is engaged with the main busbar 2.

The connection busbar 6 is formed approximately in an L shape. The finger assembly 7 is coupled to an upper end of the connection busbar 6 and the fixed contact arm 5 is connected to a lower end of the connection busbar 6.

In order to protect the internal components from arc and gas generated at a high temperature inside the circuit breaker during short circuit breakdown and to ensure insulation between the conductors or from the outside, a base bus supporter 9 formed of an insulation material is provided on the power-source-side terminal 1a of the circuit breaker.

The front portion of the base bus supporter 9 is provided with saw-toothed teeth 9a for engaging with the main busbar 2. The finger assembly 7 of each phase is exposed between the teeth 9a. Thereby, the finger assembly 7 of each phase exposed in this way may be connected to the main busbar 2 of each phase. The upper surface 9b of the base bus supporter 9 is formed to have a length that allows the upper surface to cover the upper portion of the power-source-side terminal 1a. The bottom surface 9c of the base bus supporter 9 is formed to extend deeply to the bottom surface of the MCCB 1 in order to form an exhaust port of the MCCB 1. Further, a partition 9d with a certain thickness is provided between the phases to secure insulation between the phases.

Hereinafter, a discharge flow of an arc gas in a plug-in MCCB will be described.

The arc gas generated inside the MCCB 1 in the short circuit breakdown flows to the bottom surface 9c through the discharge port 1c formed on the front surface of the MCCB 1 via the inside of the base bus supporter 9. Here, the upper surface 9b of the base bus supporter 9 has a closed structure to prevent leakage of the arc or gas.

In such terminal structure of the plug-in MCCB, a portion closed by the base bus supporter 9 is formed. Therefore, it is necessary to check whether or not there is a thermal abnormality in the connector for the main busbar 2 in order to eliminate a secondary damage such as dielectric breakdown caused by the arc or gas and to secure insulation performance of the distribution board. That is, temperature management should be performed.

In order to check thermal abnormality of the MCCB 1 according to the prior art, the temperature of the connector of the main busbar 2 should be observed using a thermal imaging camera or a contact temperature sensor. However, since the base bus supporter 9 is provided at the connector of the main busbar 2, it is difficult to check the condition of the connector of the main busbar 2 using a thermal imaging camera or a contact temperature sensor. For this reason, it is required to separate the MCCB 1 from the main busbar 2 and separate the base bus supporter 9 to perform the temperature checking operation.

SUMMARY

It is an object of the present disclosure to provide a molded case circuit breaker capable of measuring the temperature of the connector of a main busbar with the molded case circuit breaker connected to the main busbar.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a molded case circuit breaker for use in connection with a main busbar provided on a distribution board panel includes a power-source-side terminal provided to a front portion of a case and having a terminal assembly hole formed at an upper portion thereof; a base bus supporter comprising a connector protruding from a front surface thereof so as to engage with the main busbar installed on one side of the distribution board panel, the base bus supporter being coupled to an upper surface and a lower surface of the power-source-side terminal; an auxiliary cover plate coupled to an upper portion of the power-source-side terminal and provided with a temperature measurement hole communicating with the terminal assembly hole, the auxiliary cover plate being coupled with a part of the base bus supporter to support the base bus supporter from an outside.

An upper portion and a lower portion of the base bus supporter may be provided with an upper surface coupling portion and a lower surface coupling portion, respectively, the upper surface coupling portion and the lower surface coupling portion protruding rearward so as to be coupled to the upper surface and the lower surface of the power-source-side terminal, respectively.

The upper surface coupling portion may be provided with a fastening part coupled to the upper surface of the power-source-side terminal to couple the upper surface coupling portion to the power-source-side terminal, wherein the fastening part may be formed to protrude rearward from the upper surface coupling portion, and be arranged at a position where the fastening part does not interfere with the terminal assembly hole.

The auxiliary cover plate may be provided with an insertion groove concavely formed to allow a part of the upper surface coupling portion to be inserted thereinto.

The auxiliary cover plate may be provided with a connection conduit for connecting the temperature measurement hole and the terminal assembly hole, wherein the connection conduit may protrude from the auxiliary cover plate so as to enclose a passage connecting the temperature measurement hole and the terminal assembly hole.

The auxiliary cover plate may include a plurality of coupling holes for coupling the auxiliary cover plate to the upper surface of the power-source-side terminal.

A diameter of the temperature measurement hole may be smaller than a diameter of the terminal assembly hole.

A temperature sensor may be provided in the terminal assembly hole.

The molded case circuit breaker may further include a notification means configured to alert a user when a temperature value of the temperature sensor is higher than or equal to a set temperature, the notification means including a light emitting means or a sound generating means.

An interior of the power-source-side terminal may be provided with a fixed contact arm and a connection member for connecting the fixed contact arm to the main busbar, wherein the connection member may be exposed to an outside of the molded case circuit breaker through a passage formed by the terminal assembly hole and the temperature measurement hole.

With an MCCB according to an embodiment of the present disclosure, the temperature of the connector of a main busbar can be measured with the MCCB connected to the main busbar.

In addition, such temperature monitoring can be performed at any time, and when the temperature is outside a set temperature range, alarm can be immediately transmitted to the user.

DETAILED DESCRIPTION

Hereinafter, embodiments of the present invention will be described in detail with reference to the accompanying drawings. It should be understood that the present invention is not limited to the following embodiments, and that the embodiments are provided for illustrative purposes only.

Figure 5:
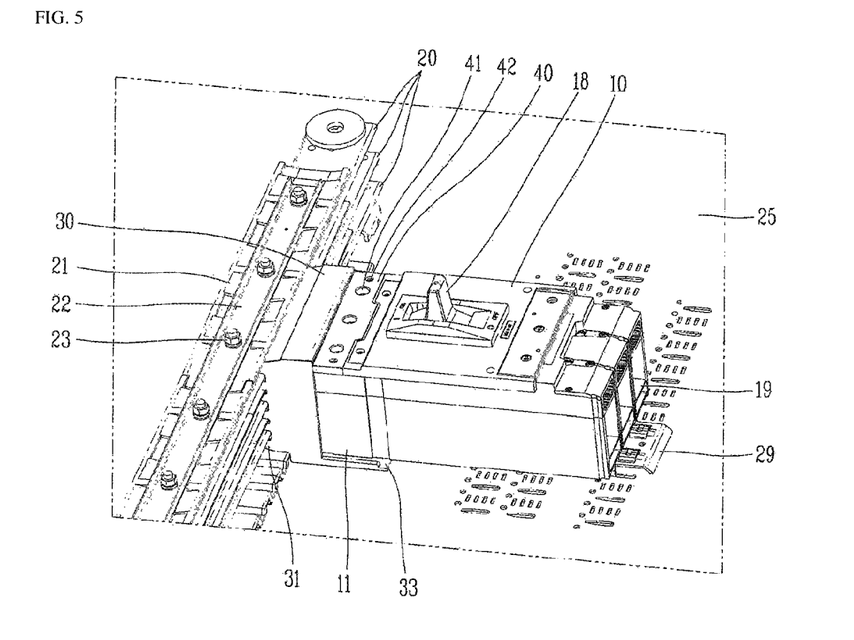
FIG. 5 is a perspective view illustrating an MCCB installed in a distribution board according to an embodiment of the present disclosure.
Figure 6:
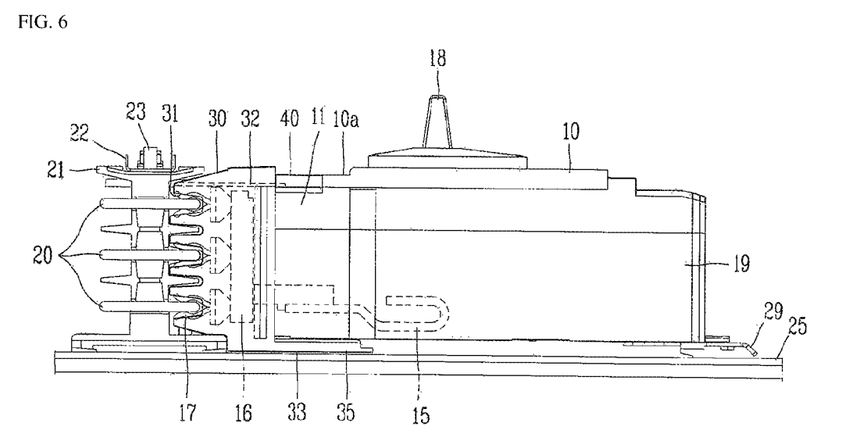
FIG. 6 is a side perspective view of FIG. 5, where only main parts related to the present disclosure are shown.
Figure 7:
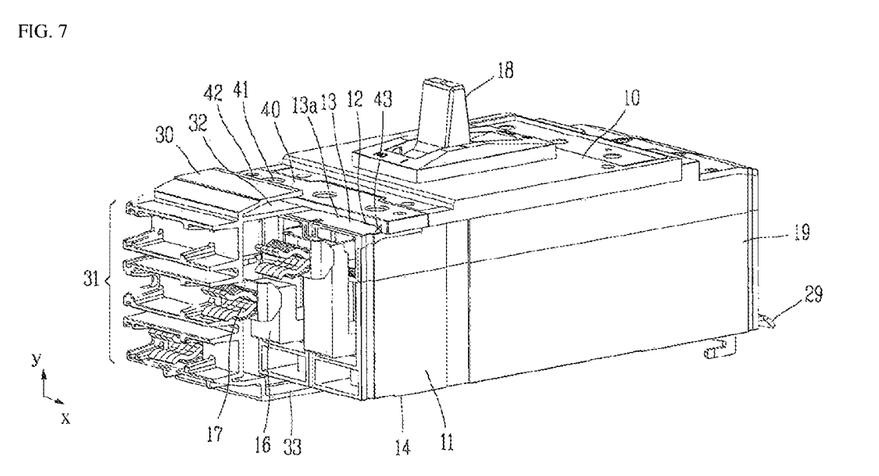
FIG. 7 is a front perspective view showing an MCCB applied to FIG. 5, where the base bus supporter is partially cut away.
Figure 8:
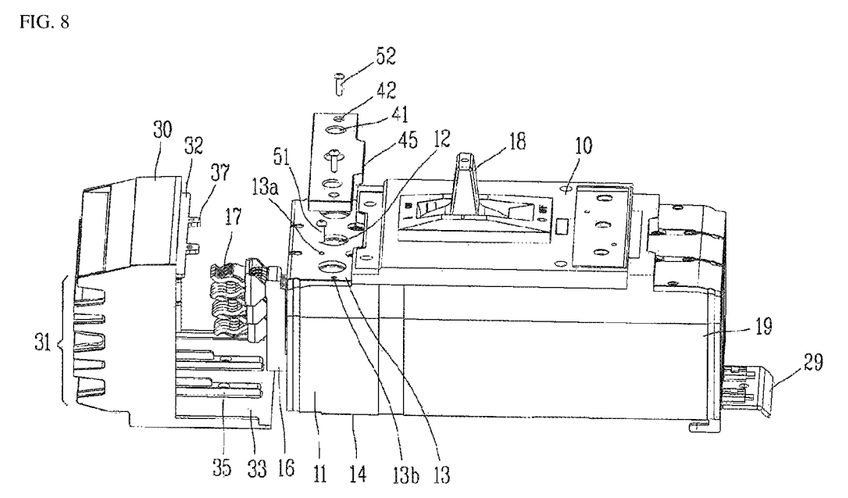
FIG. 8 is an exploded perspective view showing a power-source-side terminal in FIG. 5.

FIG. 5 is a perspective view illustrating an MCCB installed in a distribution board according to an embodiment of the present disclosure. FIG. 6 is a side perspective view of FIG. 5. FIG. 7 is a front perspective view showing an MCCB applied to FIG. 5, where the base bus supporter is partially cut away. FIG. 8 is an exploded perspective view showing a power-source-side terminal in FIG. 5. Hereinafter, an MCCB according to each embodiment of the present disclosure will be described in detail with reference to the drawings.

The MCCB according to an embodiment of the present disclosure includes a power-source-side terminal 11 having a terminal assembly hole 12 formed on an upper portion thereof, a base bus supporter 30 including a connector 31 protruding from a front surface thereof so as to engage with a main busbar 20 installed on one side of a distribution board panel 25, the base bus supporter 30 being coupled to an upper surface 13 and a lower surface 14 of the power-source-side terminal 11, and an auxiliary cover plate 40 coupled to an upper portion of the power-source-side terminal 11 and provided at a portion thereof with a temperature measurement hole 41 communicating with the assembly hole 12.

The case 10 of the MCCB is formed approximately in the shape of a rectangular parallelepiped box.

The upper portion of the case 10 is provided with a handle 18 for operating an opening/closing mechanism. The handle 18 may be turned to the On position, the Off position, and the reset position.

The power-source-side terminal 11, which can be connected to a power line, is provided on the front portion (the left side in the figure) of the case 10, and a load-side terminal 19, which can connected to a load, is provided on the rear portion (the right side in the figure) of the case 10.

A fixed contact arm 15 is provided inside the power-source-side terminal 11. Although not separately shown, a movable contact which can be brought into contact with or separated from the fixed contact arm 15 is provided inside the case 10. The movable contact arm connects or disconnects the circuit according to operation of the opening/closing mechanism.

A plurality of main busbars 20 is provided on the distribution board panel 25. In the case of a three-phase circuit, three main busbars 20 may be installed in parallel. Each of the main busbars 20 may be mounted on the distribution board panel 25 by a busbar mounting member 21, a busbar mounting bracket 22 and a fastening screw 23, which are formed of an insulation material.

The load-side terminal 19 of the case 10 is fixed to the distribution board panel 25 by a mounting bracket 29.

The power-source-side terminal 11 is provided with a connection member for connecting the fixed contact arm 15, which is a power-source-side terminal, to the main busbar 20. The connection member may include a connection busbar 16 and a finger assembly 17. The connection busbar 16 is bent in an L shape when viewed from a side. The lower end of the connection busbar 16 is connected to the fixed contact arm 15, and the upper end of the connection busbar 16 is exposed to the front of the power-source-side terminal 11.

The finger assembly 17 is coupled to the upper end of the connection busbar 16. The finger assembly 17 may be formed in a clip shape so as to engage with the main busbar 20. Here, the finger assemblies 17 of the respective phases may be positioned at different heights. For example, the finger assembly of the R phase is provided at a position having the uppermost main busbar, and the finger assembly of the T phase is provided at the position having the lowermost main busbar.

Figure 9:
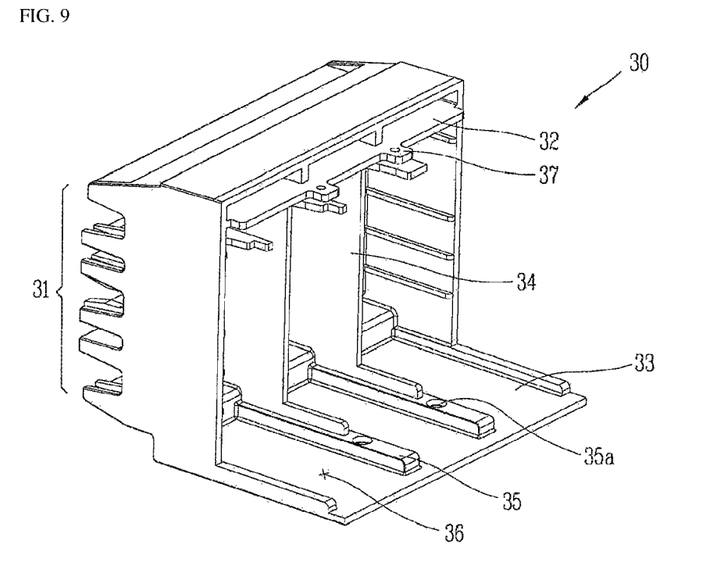
FIG. 9 is a perspective view showing a base bus supporter applied to FIG. 5.

The MCCB is provided with a base bus supporter 30 to protect a connector between the power-source-side terminal 11 and the main busbar 20 and to maintain insulation from the outside. The base bus supporter 30 is formed of an insulation material. FIG. 9 is a perspective view showing the base bus supporter.

The base bus supporter 30 is provided on the power-source-side terminal 11 and is formed to enclose the finger assembly 17 and the connection busbar 16. The base bus supporter 30 may be formed in the shape of a box which has an open back.

The base bus supporter 30 is provided with a connector 31 at the front portion thereof. When viewed from a side, the connector 31 may be formed in the shape of a plurality of teeth so as to be sandwiched between the main busbars 20. The teeth may be formed to be engageable with the main busbars 20 and the busbar mounting member 21. A hole is formed in the front portion of the base bus supporter 30, and the finger assembly 17 may be exposed to the connector 31 through this hole. The finger assemblies 17 provided for the respective phases are arranged at different vertical positions and horizontal positions, respectively. That is, referring to FIG. 7, the finger assemblies 17 of the respective phases may be disposed at different positions in the xy plane. For example, the finger assembly 17 of the R phase may be disposed at the rightmost position on the x-axis and the uppermost position on the y-axis. The finger assembly 17 of the T phase may be disposed at the leftmost position on the x-axis and the lowermost position on the y-axis.

The upper and lower portions of the base bus supporter 30 are provided with an upper surface coupling portion 32 and a lower surface coupling portion 33, which protrude rearward, respectively. The upper surface coupling portion 32 may be coupled to the upper surface 13 of the power-source-side terminal 11 and the lower surface coupling portion 33 may be coupled to the lower surface 14 of the power-source-side terminal 11. The upper surface coupling portion 32 and the lower surface coupling portion 33 may be formed as a plate.

The lower surface coupling portion 33 of the base bus supporter 30 protrudes rearward so as to enclose the lower surface 14 of the power-source-side terminal 11. The lower surface coupling portion 33 is provided with a plurality of ribs 35. The plurality of ribs 35 defines a discharge space 36 between the lower coupling portion 33 and the lower surface 14 of the power-source-side terminal 11. The arc gas produced when the short circuit breakdown occurs is finally discharged to the outside through the discharge space 36. The ribs 35 may be formed to extend from a partition 34. A part of the rib 35 is provided with a fastening hole 35a for fastening the base bus supporter 30 to the lower surface 14 of the power-source-side terminal 11.

The upper surface coupling portion 32 of the base bus supporter 30 is formed to protrude further rearward than the side surface of the base bus supporter 30 by a predetermined length. The upper surface coupling portion 32 is formed to be much shorter than the lower surface coupling portion 33.

The upper surface coupling portion 32 of the base bus supporter 30 is provided with a fastening part 37 such that the upper surface coupling portion 32 of the base bus supporter 30 can be coupled to the upper surface 13 of the power-source-side terminal 11. The fastening part 37 may protrude rearward from the upper surface coupling portion 32. The upper surface 13 of the power source terminal 11 is provided with a first fastening hole 13a to allow the fastening part 37 to be coupled to the power source terminal 11.

The base bus supporter 30 is coupled to the power-source-side terminal 11 of the case 10 by the fastening part 37 of the upper surface coupling portion 32 and a first fastening screw 51 arranged through the first fastening hole 13a of the upper surface 13 of the power-source-side terminal 11. Here, the upper surface coupling portion 32 is provided so as not to interfere with the terminal assembly hole 12 of the power-source-side terminal 11. That is, when the base bus supporter 30 is coupled to the power-source-side terminal 11, the upper surface coupling portion 32 is placed in front of the terminal assembly hole 12, and the fastening part 37 is placed in front of the terminal assembly hole 12 or between the terminal-unit-assembly holes 12.

The partition 34 for insulation between the phases is provided inside the base bus supporter 30. The partition 34 may be formed as a vertical wall arranged between both side surfaces of the base bus supporter 30. The partition 34 may be supported by a plurality of ribs formed therearound.

Figure 10:
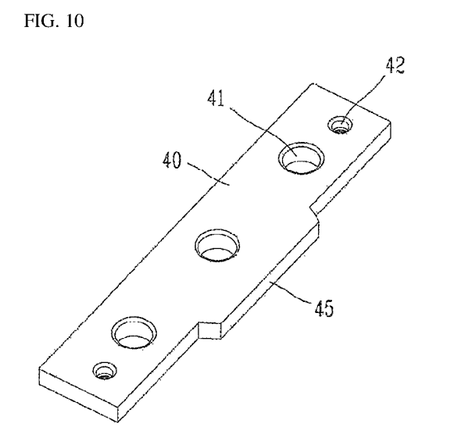
FIG. 10 is a top perspective view showing an auxiliary cover plate applied to FIG. 5.

An auxiliary cover plate 40 is provided on the rear side of the base bus supporter 30. The auxiliary cover plate 40 is coupled to the upper portion of the power-source-side terminal 11. The auxiliary cover plate 40 is provided with a plurality of temperature measurement holes 41 communicating with the terminal assembly holes 12. The diameter of the temperature measurement hole 41 may be smaller than that of the terminal assembly hole 12. Thereby, the infiltration of foreign dust or impurities may be minimized.

The auxiliary cover plate 40 is provided with a plurality of coupling holes 42 for fastening the auxiliary cover plate 40 to the power-source-side terminal 11. The power-source-side terminal 11 is provided with a second fastening hole 13b for coupling the auxiliary cover plate 40 to the power-source-side terminal 11. The auxiliary cover plate 40 is coupled to the power-source-side terminal 11 by a second fastening screw 52 which couples the coupling hole 42 and the second fastening hole 13b in a penetrating manner.

The front surface of the auxiliary cover plate 40 is provided with an insertion groove 43. A part of the upper surface coupling portion 32 of the base bus supporter 30, more specifically, a protrusion 45 protruding from the upper surface coupling portion 32 may be inserted into the insertion groove 43. Accordingly, the auxiliary cover plate 40 supports the base bus supporter 30 from the outside while pressing the upper surface coupling portion 32, which is partially inserted into the insertion groove 43.

Figure 11:
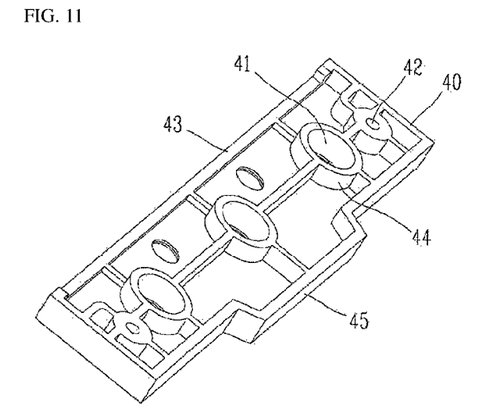
FIG. 11 is bottom perspective view showing an auxiliary cover plate applied to FIG. 5.

The auxiliary cover plate 40 may be formed in a rib structure. That is, the lower surface of the auxiliary cover plate 40 may be provided with ribs surrounding the temperature measurement hole 41 and the coupling hole 42, when viewed from the bottom. Here, one connection conduit 44 may be formed around the temperature measurement hole 41, thereby connecting the temperature measurement hole 41 and the terminal assembly hole 12.

The connection conduit 44 is formed to protrude from the lower surface of the auxiliary cover plate 40 so as to surround the passage connecting the temperature measurement hole 41 and the terminal assembly hole 12. The connection conduit 44 not only serves to guide a temperature measurement tool inserted through the temperature measurement hole 41 such that the tool smoothly passes through the terminal assembly hole 12, but also serves as a structure for reinforcing the rigidity of the auxiliary cover plate 40 while connecting the ribs formed on the lower surface.

The protrusion 45 is formed on the rear surface of the auxiliary cover plate 40. The protrusion 45 may be smoothly fitted into the recessed portion of the case 10. That is, when viewed from a side, the surface of the auxiliary cover plate 40 and the surface of the case 10 are smoothly connected to each other at the same height. As a result, the appearance may be improved in terms of aesthetics. In other words, the auxiliary cover plate 40 may be installed at the same height as the front portion 10a of the opening and closing portion of the case 10 when the auxiliary cover plate 40 is coupled to the power-source-side terminal 11. Thereby, the external appearance may be improved in terms of aesthetics.

With the MCCB according to an embodiment of the present disclosure, a temperature measurement tool can be brought into contact with or placed near the connection busbar 16 through the passage formed by connecting the temperature measurement hole 41 of the auxiliary cover plate 40 and the terminal assembly hole 12 of the power-source-side terminal 11. Accordingly, it is possible to constantly monitor thermal abnormality of the connector of the main busbar 20 and the finger assembly 17. Here, the temperature measurement tool can be any element capable of measuring the surface temperature, such as a contact temperature sensor or a thermal imaging camera. This temperature measurement operation does not require the MCCB and the base bus supporter 30 to be separated from the main busbars 20.

According to the temperature measurement operation as described above, the temperature of the connection busbar 16 may be measured by using a temperature measurement tool. Thereby, the temperature of the connector of the main busbar 20 and the finger assembly 17 adjacent or connected to the connection busbar 16 may be measured indirectly. The temperature of the finger assembly 17 and the connector of the main busbar 20 may be calculated by adding a correction factor to the measured temperature of the connection busbar 16. The correction factor may be appropriately set considering the fact that the temperature decreases as heat generated from the connection portion between the main busbar 20 and the finger assembly 17 is transferred to the connection busbar 16.

Figure 12:
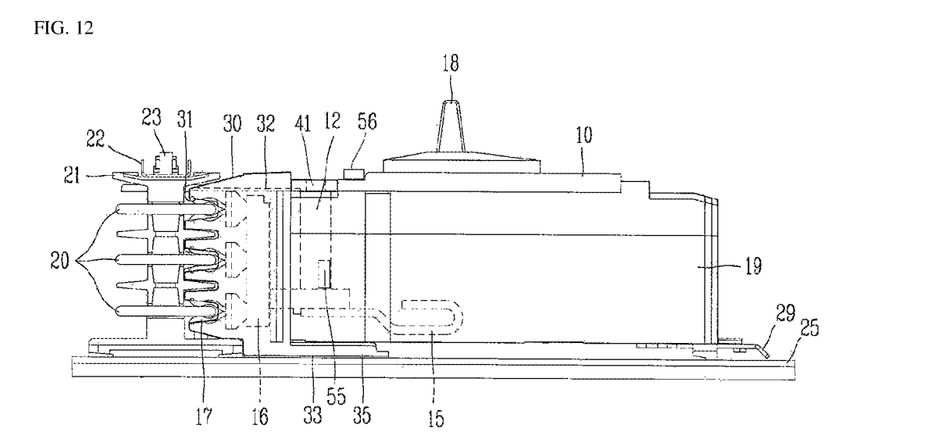
FIG. 12 is a side view showing a temperature sensor and a notification means provided in an MCCB according to an embodiment of the present disclosure.

Hereinafter, an MCCB according to another embodiment of the present disclosure will be described with reference to FIG. 12. All of the elements employed in the previous embodiment may also be employed in this embodiment.

In this embodiment, a temperature sensor 55 is provided in the terminal assembly hole 12. Since the temperature sensor 55 is constantly arranged, it is possible to perform constant temperature management without separately arranging a time for measurement.

In addition, a notification means 56 capable of notifying the user of the temperature when the temperature value of the temperature sensor 55 is higher than or equal to a set temperature is provided. The notification means 56 may be a light emitting means including a lamp or a sound generating means including a buzzer. As the notification means 56 is provided, the user may immediately alerted when the temperature is out of a set temperature range.

With the MCCB according to each embodiment of the present disclosure, the temperature of the connector of the main busbar 20 and the finger assembly 17 may be effectively monitored by using the auxiliary cover plate 40, which is provided with the temperature measurement hole 41 to measure the temperature of the connection busbar 16.

Further, since the auxiliary cover plate 40 presses the upper surface coupling portion 32 of the base bus supporter 30, the base bus supporter 30 may be effectively supported.

In addition, as the temperature sensor 55 is provided in the terminal assembly hole 12, the temperature condition may be constantly monitored.

While the present disclosure has been particularly shown and described with reference to exemplary embodiments thereof, it is to be understood that the disclosure may be embodied otherwise without departing from the spirit and scope of the disclosure. Therefore, the embodiments disclosed in the present disclosure are not intended to limit the scope of the present disclosure, and the scope of the technical idea of the present disclosure is not limited by the embodiments. That is, the scope of protection sought by the present disclosure should be construed in accordance with the appended claims, and all technical ideas within the scope of equivalents thereof should be construed as being included in the scope of the present disclosure as defined in the claims.

What is claimed is:

1. A molded case circuit breaker, comprising:
   a power-source-side terminal provided to a front portion of a case and having a terminal assembly hole formed at an upper portion thereof;
   a base bus supporter comprising a connector protruding from a front surface thereof so as to engage with the main busbar installed on one side of the distribution board panel, the base bus supporter being coupled to an upper surface and a lower surface of the power-source-side terminal;
   an auxiliary cover plate coupled to an upper portion of the power-source-side terminal and provided with a temperature measurement hole communicating with the terminal assembly hole, the auxiliary cover plate being coupled with a part of the base bus supporter to support the base bus supporter from the outside.

2. The molded case circuit breaker according to claim 1, wherein an upper portion and a lower portion of the base bus supporter are provided with an upper surface coupling portion and a lower surface coupling portion, respectively, the upper surface coupling portion and the lower surface coupling portion protruding rearward so as to be coupled to the upper surface and the lower surface of the power-source-side terminal, respectively.

3. The molded case circuit breaker according to claim 2, wherein the upper surface coupling portion is provided with a fastening part coupled to the upper surface of the power-source-side terminal to couple the upper surface coupling portion to the power-source-side terminal,
- wherein the fastening part is formed to protrude rearward from the upper surface coupling portion, and is arranged at a position where the fastening part does not interfere with the terminal assembly hole.

4. The molded case circuit breaker according to claim 1, wherein the auxiliary cover plate is provided with an insertion groove concavely formed to allow a part of the upper surface coupling portion to be inserted thereinto.

5. The molded case circuit breaker according to claim 1, wherein the auxiliary cover plate is provided with a connection conduit for connecting the temperature measurement hole and the terminal assembly hole,
- wherein the connection conduit protrudes from the auxiliary cover plate so as to enclose a passage connecting the temperature measurement hole and the terminal assembly hole.

6. The molded case circuit breaker according to claim 1, wherein the auxiliary cover plate comprises a plurality of coupling holes for coupling the auxiliary cover plate to the upper surface of the power-source-side terminal.

7. The molded case circuit breaker according to claim 1, wherein a diameter of the temperature measurement hole is smaller than a diameter of the terminal assembly hole.

8. The molded case circuit breaker according to claim 1, wherein a temperature sensor is provided in the terminal assembly hole.

9. The molded case circuit breaker according to claim 8, further comprising:
- a notification means configured to alert a user when a temperature value of the temperature sensor is higher than or equal to a set temperature, the notification means comprising a light emitting means or a sound generating means.

10. The molded case circuit breaker according to claim 1, wherein an interior of the power-source-side terminal is provided with a fixed contact arm and a connection member for connecting the fixed contact arm to the main busbar,
- wherein the connection member is exposed to an outside of the molded case circuit breaker through a passage formed by the terminal assembly hole and the temperature measurement hole.

\* \* \* \* \*